Nov. 7, 1967    A. W. KAMMERER, JR    3,351,134
CASING SEVERING TOOL WITH CENTERING PADS AND TAPERED CUTTERS
Filed May 3, 1965                                2 Sheets-Sheet 1

INVENTOR.
ARCHER W. KAMMERER, JR.
By Bernard Kriegel
ATTORNEY.

Nov. 7, 1967  A. W. KAMMERER, JR  3,351,134
CASING SEVERING TOOL WITH CENTERING PADS AND TAPERED CUTTERS
Filed May 3, 1965  2 Sheets-Sheet 2
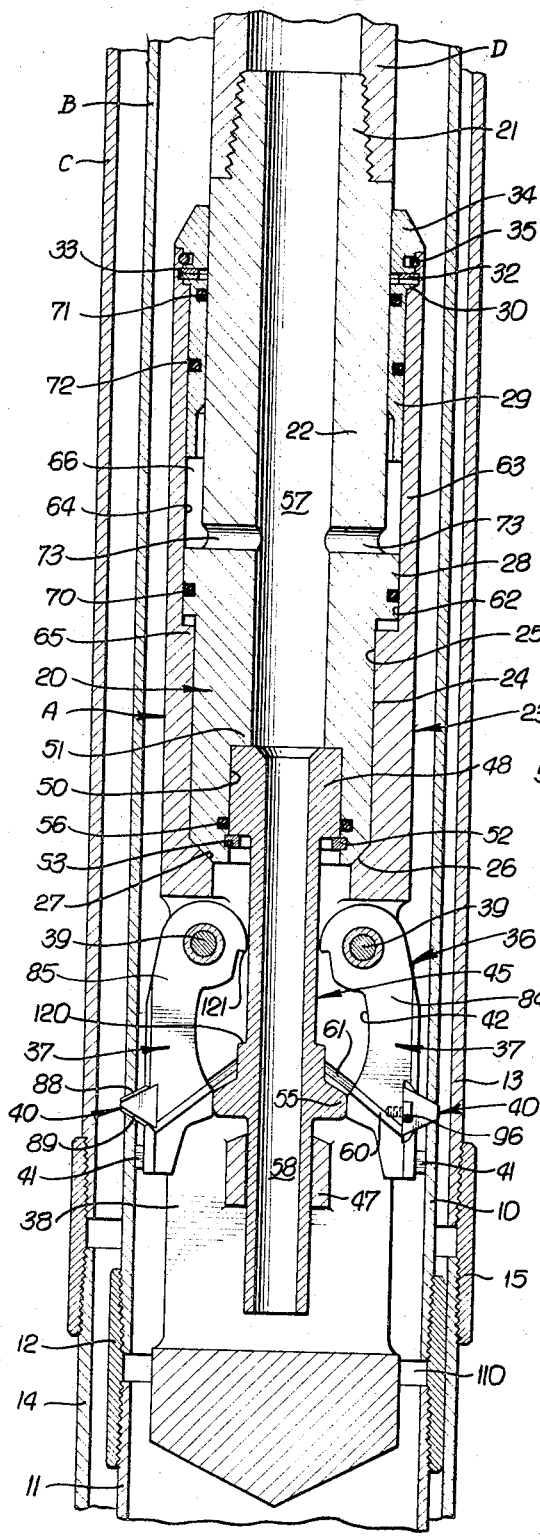
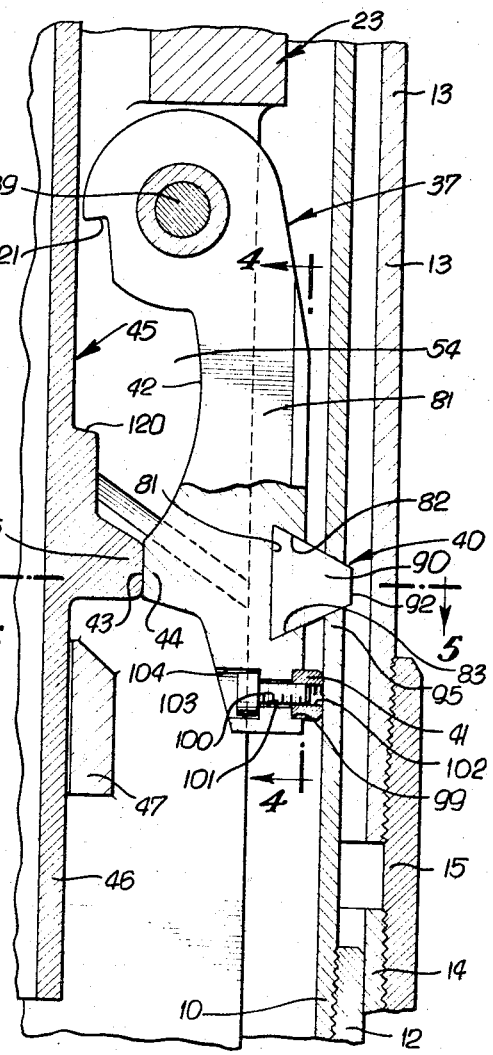
INVENTOR.
ARCHER W. KAMMERER, JR.
BY Bernard Kriegel
ATTORNEY.

United States Patent Office 3,351,134
Patented Nov. 7, 1967

3,351,134
CASING SEVERING TOOL WITH CENTERING PADS AND TAPERED CUTTERS
Archer W. Kammerer, Jr., Fullerton, Calif., assignor of one-fifth to Jean K. Lamphere, and three-fifths to Archer W. Kammerer, both of Fullerton, Calif.
Filed May 3, 1965, Ser. No. 452,558
9 Claims. (Cl. 166—55.8)

ABSTRACT OF THE DISCLOSURE

Apparatus for severing a tubular conduit disposed in a well bore having conduit severing cutters mounted on supporting members which are expandable outwardly to penetrate the cutters into the conduit while the apparatus is rotating, the supporting members having limit pads mounted thereon for simultaneous slidable engagement with the wall of the conduit to limit the extent of penetration of the cutters and to center the apparatus in the conduit.

---

The present invention relates to subsurface well bore apparatus, and more particularly to apparatus or tools for severing or parting casing, and similar conduit, strings disposed in well bores.

Rotary cutting tools have been used for severing casing strings disposed in well bores, these tools embodying expandable cutters. However, the extent of expansion of such cutters may be too great, resulting not only in the severing of the casing string but also in the performance of an undesired cutting action on an outer casing string surrounding the severed casing.

It is an object of the present invention to provide a casing severing or parting tool in which the extent of expansion of its cutter or cutters can be limited to prevent the inadvertent performance of a cutting action on a casing or the like surrounding the casing or pipe being severed.

Another object of the invention is to provide a casing severing or parting tool embodying expandable cutters and in which the extent of projection of the cutters laterally outwardly of the severed casing is definitely limited to preclude their penetration into casing encompassing the severed casing.

A further object of the invention is to provide a casing severing or parting tool embodying cutters which can be expanded and in which the extent of cutter projection outwardly of the casing is positively limited by the inner wall of the well casing on which the severing or parting action is performed, thereby insuring against excessive cutter expansion beyond the casing that might damage a casing or well bore formation surrounding the severed casing.

An additional object of the invention is to provide a casing severing or parting tool embodying expandable cutter devices which include cutter members that are readily mounted in the device and removed therefrom, the cutter devices being of sturdy construction, relatively economical to manufacture and maintain, and capable of severing the casing in a comparatively rapid manner.

Yet another object of the invention is to provide a casing severing or parting tool embodying expandable cutter devices that will automatically center the tool in the casing to be severed and thereby preclude one cutter from extending laterally from the severed casing to a greater extent than another cutter.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 2 is a view similar to FIG. 1 illustrating the cutters in their fully expanded condition and with the inner casing string severed or parted;

FIG. 3 is an enlarged fragmentary longitudinal section through a portion of the apparatus and adjacent casing strings illustrated in FIG. 2;

Figure 1:
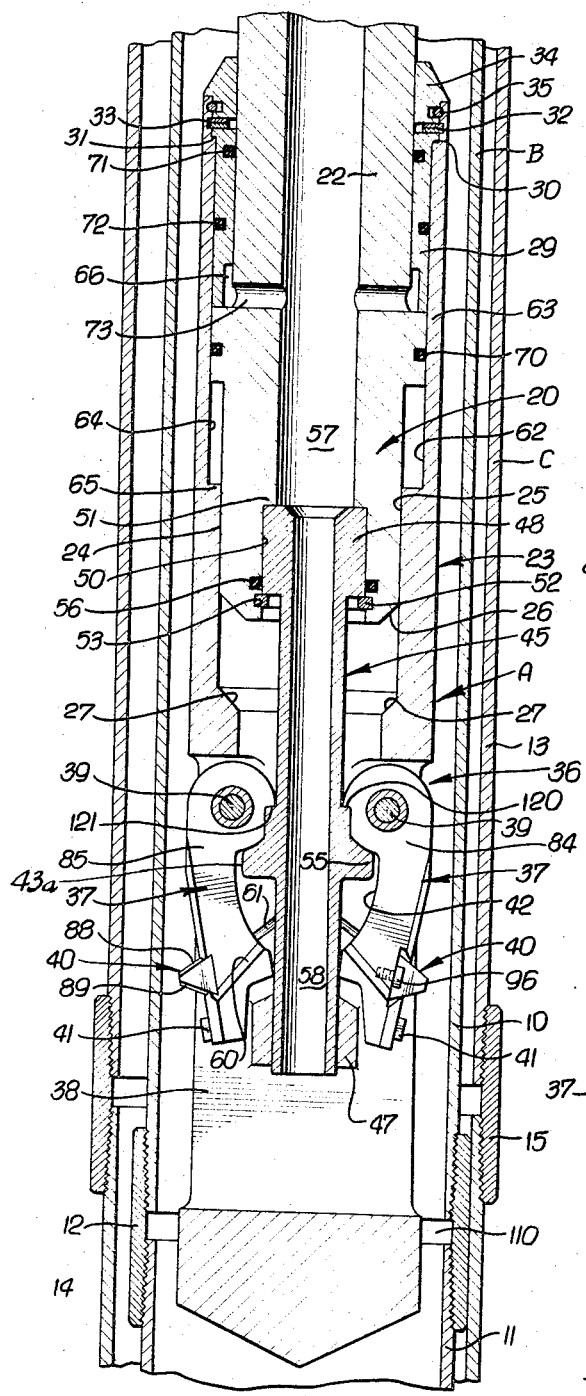
FIGURE 1 is a longitudinal section through a casing parting tool disposed in an inner casing string surrounded by an outer casing string, the cutter members being in their initial retracted position.

The well apparatus A illustrated in the drawings is specifically designed for parting or severing a casing string B at a desired location. As illustrated in the drawings, such casing string is within an outer or surrounding casing string C. The apparatus is secured to the lower end of a string of drill pipe D extending to the top of the well bore in which the casing strings are disposed, and by means of which the apparatus A is lowered through the casing strings to the location therein where the parting operation is to commence.

As specifically illustrated, the inner casing string B comprises a plurality of sections 10, 11 secured to one another by couplings 12. Similarly, the outer casing string C consists of a plurality of sections 13, 14 secured together by couplings 15. These couplings usually have external diameters greater than the external diameter of the casing sections to which they are secured so that, if the inner casing string B were to lean against the outer casing string C, as illustrated in FIGS. 1 and 2, the upper and lower casing sections 10, 11 at opposite ends of a coupling 12 would be spaced from the inner wall of the upper and lower casing sections 13, 14.

The casing parting tool or apparatus A will typically be operated in a manner to sever the casing B at a location a short distance above a coupling 12 of the inner casing string. At the severing location, the casing section to be severed, such as section 10, will be spaced inwardly from the adjacent inner wall of the surrounding outer casing section 13 because of the contact of the inner casing coupling 12 with the outer casing string C, or because of hanging of the inner casing string in the outer casing without touching the latter.

The casing severing or parting tool includes an upper mandrel 20 having an upper pin 21 threadedly connected to the lower end of the string of drill pipe D. This mandrel includes an upper kelly or drill stem member 22 slidably splined to the main body 23 of the tool. The exterior 24 of the lower portion of the kelly is non-circular in shape, being telescopically received in a companion non-circular socket 25 formed in the main tool body. As an example, the kelly exterior 24 and the socket 25 may be of hexagonal shape to enable the kelly 22 to be moved longitudinally with respect to the body 23 while still being capable of transmitting rotary motion to the body.

The mandrel 20 has a limited range of longitudinal movement within the body 23, its relative downward movement being determined by engagement of the lower end 26 of the kelly with an inwardly directed body shoulder 27, and its relative upward movement being limited by engagement of an external shoulder or piston portion 28 of the kelly with a cylindrical head 29 secured to the body. The upper end of the head has a flange 30 engaging a body shoulder 31, the head being prevented from moving upwardly of the body by split snap retainer rings 32 fitting in a body groove 33 and overlying the head flange 30. An annular guide 34 is releasably secured to the body by a split snap ring 35 above the retainer rings 32.

The body 23 has a plurality of expansible parts on it, which include cutter devices 36 for severing or parting a casing section. These cutter devices include cutter supporting members 37 pivotally mounted in body slots 38 on hinge pins 39 suitably secured to the body to prevent their loss therefrom. Each cutter supporting member 37 depends from the hinge pin and carries a cutter 40 in its lower portion and also a centering pad or insert 41 adapted to slide around the inner wall of a casing section 10, 11.

For purposes of illustration, only a pair of cutter devices 36 is illustrated, being mounted in a pair of slots 38, or a single slot, extending transversely through the entire bit body. It is to be understood, however, that three or more cutter devices, preferably uniformly spaced from one another circumferentially of the body 23, can be mounted in individual body slots 38 for expansion outwardly of the body in effecting a casing parting, penetrating, or severing action.

The cutter supporting members or arms 37 and the cutters 40 mounted thereon tend to occupy a retracted position substantially entirely within the confines of the main body 23 of the bit. The cutter devices are expandable outwardly to sever the casing. In order to accomplish the expansion, each cutter supporting member 37 has an inclined expander surface 42 on its inner portion below the hinge pin 39 which tapers in a downward and inward direction. Each expander surface terminates in a lock surface 43 formed on a lock portion 44 of the cutter supporting member or arm. The outward expansion is accomplished by producing relative longitudinal movement between the mandrel 20 and bit body 23, which will produce relative longitudinal movement between the cutter supporting members 37 and a tubular member 45 of the mandrel 20.

The tubular member 45 includes a portion 46 slidable within a bridge 47 secured to the body and extending across the body slots 38. This bridge is disposed below the lock portions 44 of the cutter supporting members. The tubular member is capable of moving downwardly through the bridge 47 to a substantial extent since the latter is disposed a substantial distance above the lower end of the body slots 38. The upper end 48 of the tubular member is piloted within a socket 50 formed on the lower portion of the kelly 22. An enlarged boss or the upper end 48 on the tubular member engages a downwardly facing shoulder 51 of the kelly, the tubular member being held against this shoulder by a suitable split retainer or lock ring 52 snapped into an internal groove 53 encompassing the kelly socket and engaging the lower end of the tubular member boss. Located initially and substantially above the bridge 47 and below the hinge pins 39, and in supporting arm recesses 54, is a mandrel lock and expander 55 adapted to engage the tapered expander surfaces 42 and also the lock surfaces 43. The lock and expander 55 may be formed integral with the tubular member 45. Leakage of fluid around the tubular member is prevented by a suitable side seal ring 56 in the kelly engaging the exterior of the boss 48. Accordingly, fluid pumped downwardly from the drill pipe D and through the central kelly passage 57 is confined for movement downwardly through the tubular member passage 58, which is of smaller diameter than the kelly passage, this fluid discharging from the lower end of the tubular member 45 for the purpose of removing the casing cuttings and to clean the cutters 40 and maintain them in a cool condition.

Assuming the body 23 of the tool to be elevated relatively along the tubular mandrel 20, the inclined expander surfaces 42 of the cutter supporting arms will be shifted upwardly along the lock and expander portion 55 of the tubular member. During such upward shifting, the cutter supporting members 37 and the cutters 40 carried thereby will be pivoted about the hinge pins 39 and urged in an outward direction. The upward movement of the body 23 with respect to the tubular mandrel 20 can continue until the cutter structures or devices 36 have been shifted outwardly to their fullest extent, as determined by engagement of stop shoulders 60 on the cutter supporting members with companion shoulders 61 formed in the body on opposite sides of the body slots 38. When such engagement occurs, the lower end 26 of the kelly portion of the tubular mandrel will engage the body shoulder 27, and the lock expander 55 on the tubular member will be disposed behind and in engagement with the lock portions 44 of the cutter supporting members or arms 37 (FIGS. 2, 3).

Relative longitudinal movement between the tubular mandrel 20 and body 23 of the tool is accomplished hydraulically in the specific form of apparatus disclosed in the drawings. Thus, the piston or enlarged portion 28 on the drill stem 22 is received within a counterbore 62 in the upper portion 63 of the body 23 of the tool. This upper portion actually constitutes a cylinder having a cylindrical wall 64 extending from the lower shoulder 65 defining the bottom of the counterbore to the cylinder head 29.

A confined cylinder space 66 is formed between the piston portion 28 of the kelly, the periphery of the kelly above the piston, and the cylinder 63, 29. A suitable side seal ring 70 is mounted on the piston which is adapted to slidably seal against the cylindrical wall 64 of the cylinder. Fluid is thereby prevented from passing in a downward direction between the piston and cylinder. Similarly, fluid is prevented from passing in an upward direction out of the annular cylinder space 66 by an inner side seal ring 71 carried by the cylinder head 29 and slidably and sealingly engaging the periphery of the kelly 22 above the piston 28, and also by an outer side seal ring 72 on the head sealingly engaging the cylinder wall 64.

Fluid under pressure in the string of drill pipe D and in the tubular mandrel passage 57 can be fed into the cylinder space 66 through one or more side ports 73 establishing communication between the central passage through the kelly and the cylinder space. Such fluid under pressure is developed by virtue of the fact that the area of the passage 58 through the tubular member is substantially less than the area of the kelly passage 57. As a result, the pumping of drilling mud or other fluid at an adequate rate through the apparatus will build up a back pressure in the passage 57 which will be imposed on the fluid in the cylinder space 66, acting upon the cylinder head 29 to urge the body 23 of the tool in an upward direction with respect to the tubular mandrel 20, to secure outward expansion of the cutter supporting members 37 and cutters 40 to their fullest extent.

A casing parting cutter 40 is mounted on each cutter supporting member or arm 37, the cutter being mounted in a dovetail groove 80 in an outer portion of the arm. The groove has an inner base 81 and upper and lower sides 82, 83 that taper or converge toward each other in a direction laterally outwardly of the arm, and which also taper or converge toward each other in a direction extending from the leading side 84 of the supporting arm to its trailing side 85, as regards the direction of rotation of the drill bit and arms in the well bore. In other words, the leading end 86 of the groove 80 is much wider than the trailing end 87 of the groove.

Figure 4:
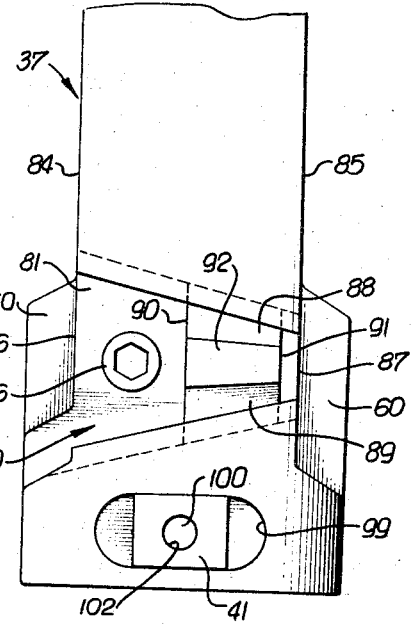
FIG. 4 is a section taken along the line 4—4 on FIG. 3.
Figure 5:
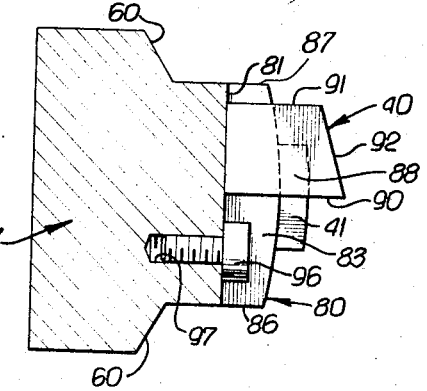
FIG. 5 is a section taken along the line 5—5 on FIG. 3.

Each casing parting cutter 40 is shaped to correspond generally to the shape of the groove. Such cutter has upper and lower sides 88, 89 that taper or converge toward each other in a lateral outward direction, the inclination of the upper and lower sides corresponding to the inclination of the upper and lower sides 82, 83 of the groove. In addition, the upper and lower sides 88, 89 of each cutter taper or converge toward each other in a direction from its leading face 90 toward its trailing face 91, their inclination or taper conforming to the inclination or taper of the upper and lower sides 82, 83 of the groove. The length of each cutter between its leading face 90 and its trailing face 91 is substantially less than the length of the supporting arm groove 80, the cutter being adapted to be slipped inwardly in the groove through its forward end 86 and coming into snug wedging engagement with the sides 82, 83 of the groove, such as disclosed most clearly in FIGS. 4 and 5, with the trailing face 91 of the cutter still disposed inwardly of the trailing side 85 of the supporting member 37. The lateral length of the tapered sides 88, 89 of the cutter is substantially greater than the lateral depth of the groove 80 so that the cutter projects outwardly of the outermost surface of its companion supporting arm 37 to a substantial extent, such that the cutter can completely sever and penetrate through the wall of the well casing B without the supporting arm 37 contacting the casing wall. With the cutter wedge firmly within its companion groove, its leading face 90 lies preferably in a radial plane of the severing tool A. The outer end 92 of the cutter tapers from its leading face 90 toward its trailing face 91 so as to provide cutting clearance with the well casing.

Each cutter 40 has hardfacing material, such as tungsten carbide, on its leading face 90 fully between its upper and lower sides 88, 89. It may also have a suitable hardfacing material on its lower side 89, which is not provided to effect any cutting action on the casing, but to function as a bearing so that the cutter 40 can slide around an upwardly extending shoulder 95 of the casing at the lower end of the cut being made therein.

Each cutter 40 is retained in its groove 80 by a retaining screw 96 threaded into the arm 37 at its base portion 81 in advance of the leading face 90 of the cutter. The cutter need merely be slipped into the groove 80 through its large end 86 and then the screw 96 threaded in its companion threaded bore 97 in the supporting arm. Even if the cutter 40 may be loose in its groove 80, it cannot move sufficiently forwardly of the groove as to be inadvertently removed therefrom. When moving rearwardly in the groove, which will occur when the casing severing action commences, it is wedged firmly against the tapered sides 82, 83 of the groove.

For the purpose of centering the tool A in the well casing B, so that all cutter members 40 will project through the casing B and beyond its outer periphery to the same extent, each cutter supporting arm 37 has a limit pad or insert 41 secured thereto. As shown, each limit pad is mounted in a groove 99 in a cutter supporting arm below the cutter 40, being retained therein by a holding screw 100 which is inserted from the rear of the arm through a hole 101 in the arm and threaded into a threaded hole 102 in the pad. The head 103 of the screw is received within a counterbore 104 and bears against the base of the latter when the screw is tightened to firmly secure the limit pad 41 within its groove 99, or the head 103 may engage an intervening lock washer (not shown) that engages the base of the counterbore 104. The exterior of each pad 41 is curved or is arcuately shaped to conform to the curvature of the inner casing wall. For the purpose of resisting abrasive wear, the outer face of each pad may be hardfaced.

In the performance of a casing parting operation, the tool A is lowered in the well casing B to a position which is a short distance below the location at which the inner casing is to be severed. Fluid is then pumped through the drill pipe and the tool passage, creating a back pressure in the mandrel passage 57 that will act on the liquid in the cylinder space 66 and elevate the body 23 along the mandrel 20, causing the inclined expander surfaces 42 to engage the mandrel expander 55 and shift the supporting arms 37 outwardly. The drill pipe D and tool A can be elevated slowly, and when the cutters are opposite a coupling space 110, they will expand outwardly into such space, resisting upward movement of the drill pipe D and tool A, and giving the operator at the top of the well bore an indication that the coupling space has been located. The pumping of fluid can be arrested, which will allow the cutter supporting members 37 and cutters 40 to shift inwardly, whereupon the drill pipe can be elevated a short distance to raise the cutters 40 above the coupling space to the desired extent and locate them in position for severing an inner casing section 10. The drill pipe and apparatus can then be rotated at the desired speed and drilling fluid or liquid again pumped down through the drill pipe D and through the tool A, the back pressure developed in the mandrel again elevating the body 23 of the tool along the mandrel 20, resulting in outward expansion of the cutter supporting members 37 and of the cutters 40 against the wall of the inner casing section 10. These cutters will commence severing the casing section, and as the severing action continues, the body 23 of the tool will be elevated progressively along the mandrel 20 to further expand the cutter supporting arms 37 and cutters 40 outwardly until the cutters completely sever the casing, at which time the body of the tool can move upwardly to its maximum extent along the mandrel, as determined by engagement of the body shoulder 27 with the lower end 26 of the kelley 22. When in this position, the mandrel lock and expander 55 is disposed behind the lock portions 44 of the cutter supporting members 37, as disclosed in FIG. 2, thereby precluding inward retraction of the cutter supporting arms 37 and cutters 40.

During the cutting action, each cutter 40 is constantly urged and held in a rearward direction within its companion tapered groove 80, maintaining a tight condition with respect to the supporting arm 37. As the cutters expand outwardly in severing the casing, the limit pads or inserts 41 move toward the casing wall and tend to place and maintain the cutting tool A coaxial of the inner casing string B. If the cutting tool tends to lean over towards one side of the inner casing string B, which may be the side at which a coupling 12 may be leaning against the outer casing string C, the pads 41 will come into contact with the inner wall of the inner casing string B and prevent the cutters 40 from penetrating the inner casing and continue moving outwardly into engagement with the outer casing section 13 to commence the performance of a cutting or severing action thereon. Again, assuming the cutting tool A to tend to shift laterally toward one side of the inner casing B and the absence of the limit pads 41, the cutters could damage the outer casing. However, with the limit pads in place, they engage the casing and tend to center all of the cutters 40 coaxial of the inner casing, insuring that the cutters can only penetrate the inner casing B to sever it and extend therebyeond by a distance which is less than the lateral gap between the inner and outer casing sections 10, 13.

Actually, the cutting or severing action on the casing occurs in an upward and outward direction. The lower sides 89 of the cutters will slide around the upwardly facing end 95 of the casing portion below the cutters, and the pads 41 will slide around the inner wall of the casing portion therebelow to maintain the cutters 40 and the entire cutting tool A in a position substantially coaxial of the inner casing section 10, and, more specifically, coaxial of the portion of the casing section below the cut.

The operator can be informed of the fact that the casing B has been severed by his ability to impose downweight on the drill pipe D, which is transmitted to the tool A. If the mandrel 20 has not been shifted downwardly along the cutter devices 36 to the maximum extent, at which the lock member 55 is still disposed above the lock portions 44 of the cutter arms 37, the imposition of the downweight will cause the tapered lower sides 89 of the cutters to shift the cuter supporting arms 37 inwardly to a retracted position, the downweight being dissipated and giving the operator a positive indication that the casing has not been severed. It is only when the mandrel lock 55 is disposed fully within the lock portions 44 of the cutter members 37 that the cutters 40 have fully penetrated the casing to sever the latter. At this time, the imposition of downweight on the drill pipe D and on the tool A will prevent the inward pinching of the cutter arms 37, since the coengageable lock surfaces 43a, 43 on the mandrel lock 55 and the cutter arms are substantially parallel to the axis of the tool. Since there will be no loss of the downweight, which downweight can be quite substantial, the operator will know that the casing B has been fully severed.

Following the severing action, the pumping of fluid through the apparatus is discontinued and the drill pipe D elevated, which will elevate the mandrel 20 within the body 23 of the tool and elevate the mandrel lock 55 from the lock surfaces 43 on the cutter supporting arms 37. The mandrel 20 moves upwardly until the piston 28 engages the cylindrical head 29, pulling the body 23 upwardly, the cutter supporting arms 37 and cutters 40 shifting inwardly to their initial retracted position. If they do not shift inwardly, then an upwardly projecting shoulder 120 on the tubular mandrel member 45 can engage inwardly projecting fingers 121 on the cutter supporting arms, to shift such fingers upwardly and move the arms 37 and cutters 40 inwardly back to the position illustrated in FIG. 1. The drill pipe D and cutting tool A can then be elevated in the well casing and removed therefrom.

I claim:

1. In apparatus for cutting a tubular conduit disposed in a well bore: a body; a plurality of circumferentially spaced supporting members mounted on said body for expansion laterally of said body, each supporting member having a cutter thereon; means for expanding said supporting members and cutters laterally to penetrate said cutters into the conduit; and means on said supporting members longitudinally spaced from said cutters and having smooth outer surfaces simultaneously slidably engageable with the conduit to limit the extent of lateral movement of said cutters beyond the periphery of the conduit and to center said apparatus in the tubular conduit.

2. In apparatus for cutting a tubular conduit disposed in a well bore: a body; a plurality of circumferentially spaced supporting members mounted on said body for expansion laterally of said body, each supporting member having a cutter thereon; means for expanding said supporting members and cutters laterally to penetrate said cutters into the conduit, said expanding means including a mandrel shiftable longitudinally in said body and adapted to expand said supporting members and cutters to a predetermined extent; and means on said supporting members longitudinally spaced from said cutters and having smooth outer surfaces simultaneously slidably engageable with the conduit to uniformly space said supporting members and cutters from the axis of the conduit and uniformly limit the extent of lateral movement of all of said cutters beyond the periphery of the conduit.

3. In apparatus for severing a tubular conduit disposed in a well bore: a rotatable body; a plurality of circumferentially spaced supporting members mounted on said body for expansion laterally of said body, each supporting member having a cutter thereon; means for expanding said supporting members and cutters laterally to penetrate said cutters into the conduit and sever the conduit, said expanding means including a mandrel shiftable longitudinally in said body and adapted to expand said supporting members and cutters to a predetermined extent; and pads on said supporting members longitudinally spaced from said cutters and having smooth outer surfaces simultaneously slidably engageable with and rotatable around the inner wall of the conduit to uniformly space said supporting members and cutters from the axis of the conduit and uniformly limit the extent of lateral movement of all of said cutters beyond the periphery of the conduit.

4. In apparatus for cutting a tubular conduit disposed in a well bore: a rotatable body; a supporting member mounted on said body for expansion laterally of said body and rotatable therewith, said member having a groove therein, said groove having side walls tapering toward each other from the leading side of said member to its trailing side; a cutter in said groove having sides conforming to and engaging said tapered side walls; and means for expanding said supporting member and cutter laterally to penetrate said cutter in the conduit upon rotation of said body, supporting member and cutter.

5. In apparatus for cutting a tubular conduit disposed in a well bore: a rotatable body; a supporting member mounted on said body for expansion laterally of said body and rotatable therewith, said member having a groove therein, said groove having side walls tapering toward each other from the leading side of said member to its trailing side; a cutter in said groove having sides conforming to and engaging said tapered side walls; means for expanding said supporting member and cutter laterally to penetrate said cutter in the conduit upon rotation of said body, supporting member and cutter; and means on said supporting member engageable with the conduit to limit the extent of lateral movement of said cutter beyond the periphery of the conduit.

6. In apparatus for severing a tubular conduit disposed in a well bore: a body; a plurality of circumferentially spaced supporting members mounted on said body for expansion laterally outwardly of said body, each supporting member having a groove therein, said groove having side walls tapering toward each other from the leading side of said member to its trailing side; a cutter in each of said grooves having sides conforming to and engaging said tapered side walls; means for expanding said supporting members and cutters laterally to penetrate said cutters into the conduit, said expanding means including a mandrel shiftable longitudinally in said body and adapted to expand said supporting members and cutters to a predetermined extent; and means on said supporting members engageable with the conduit to uniformly space said supporting members and cutters from the axis of the conduit and uniformly limit the extent of lateral movement of all of said cutters beyond the periphery of the conduit.

7. In apparatus for severing a tubular conduit disposed in a well bore: a body; a plurality of circumferentially spaced supporting members mounted on said body for expansion laterally outwardly of said body, each supporting member having a groove therein, said groove having side walls tapering toward each other from the leading side of said member to its trailing side; a cutter in each of said grooves having sides conforming to and engaging said tapered side walls; means for expanding said supporting members and cutters laterally to penetrate said cutters into the conduit, said expanding means including a mandrel shiftable longitudinally in said body and adapted to expand said supporting members and cutters to a predetermined extent; and pads on said supporting members engageable with and rotatable around the inner wall of the conduit to limit the extent of lateral movement of said cutters beyond the periphery of the conduit.

8. In apparatus for cutting a tubular conduit disposed in a well bore: a rotatable body; a supporting member mounted on said body for expansion laterally of said body and rotatable therewith, said member having a dovetailed groove therein, said groove having side walls tapering toward each other from the leading side of said member to its trailing side; a dovetail cutter in said groove having sides conforming to and engaging said tapered side walls; and means for expanding said supporting member and cutter laterally to penetrate said cutter in the conduit upon rotation of said body, supporting member and cutter.

9. In apparatus for cutting a tubular conduit disposed in a well bore: a rotatable body; a supporting member mounted on said body for expansion laterally of said body and rotatable therewith, said member having a dovetailed groove therein, said groove having side walls tapering toward each other from the leading side of said member to its trailing side; a dovetail cutter in said groove having sides conforming to and engaging said tapered side walls; means for expanding said supporting member and cutter laterally to penetrate said cutter in the conduit upon rotation of said body, supporting member and cutter; and means on said supporting member engageable with the leading end of said cutter to prevent removal of said cutter from said groove.

References Cited

UNITED STATES PATENTS

| | | | |
|---|---|---|---|
| 784,578 | 3/1905 | Lovekin | 30—107 |
| 1,739,932 | 12/1929 | Ventresca | 166—55.8 |
| 1,773,307 | 8/1930 | Grant | 175—283 X |
| 1,919,881 | 7/1933 | Ellis | 166—55.8 |
| 2,084,606 | 6/1937 | Brannon et al. | 166—55.7 |
| 2,108,330 | 2/1938 | Ellis | 166—55.8 |
| 2,219,148 | 10/1940 | Bowen | 166—55.7 |
| 2,304,330 | 12/1942 | Bannister | 166—55.7 |
| 2,545,033 | 3/1951 | Kammerer | 175—290 |
| 2,976,927 | 3/1961 | Kammerer et al. | 166—55.8 |

CHARLES E. O'CONNELL, *Primary Examiner.*

I. A. CALVERT, *Assistant Examiner.*